United States Patent
Kimijima et al.

(10) Patent No.: US 8,431,265 B2
(45) Date of Patent: Apr. 30, 2013

(54) ELECTRIC CELL

(75) Inventors: Takaaki Kimijima, Fukushima (JP); Norio Mamada, Fukushima (JP)

(73) Assignee: Sony Corporation (JP)

(*) Notice: Subject to any disclaimer, the term of this patent is extended or adjusted under 35 U.S.C. 154(b) by 519 days.

(21) Appl. No.: 10/466,042

(22) PCT Filed: Nov. 8, 2002

(86) PCT No.: PCT/JP02/11669
§ 371 (c)(1),
(2), (4) Date: Jul. 11, 2003

(87) PCT Pub. No.: WO03/043105
PCT Pub. Date: May 22, 2003

(65) Prior Publication Data
US 2004/0045597 A1    Mar. 11, 2004

(30) Foreign Application Priority Data
Nov. 12, 2001   (JP) .................. P2001-346588

(51) Int. Cl.
*H01M 2/18*    (2006.01)
(52) U.S. Cl.
USPC ........... 429/139; 429/133; 429/135; 429/136; 429/138; 429/141; 429/142
(58) Field of Classification Search ............. 29/623.1–4
See application file for complete search history.

(56) References Cited

U.S. PATENT DOCUMENTS

| | | | |
|---|---|---|---|
| 5,196,280 A * | 3/1993 | Gyenes ................ | 429/144 |
| 6,337,153 B1 * | 1/2002 | Kodama et al. ........ | 429/163 |
| 2001/0005561 A1 * | 6/2001 | Yamada et al. ........ | 429/152 |
| 2002/0061448 A1 * | 5/2002 | Morigaki et al. ...... | 429/253 |
| 2002/0164531 A1 * | 11/2002 | Sekino et al. .......... | 429/331 |
| 2004/0038125 A1 * | 2/2004 | Kim et al. .............. | 429/162 |
| 2004/0043288 A1 | 3/2004 | Nishijiima et al. | |

FOREIGN PATENT DOCUMENTS
EP    0 975 031    8/1999

(Continued)

OTHER PUBLICATIONS
The definition of "between" as retrieved from http://www.credoreference.com/entry/hmdictenglang/between on Jan. 27, 2011.*

(Continued)

*Primary Examiner* — Cynthia Lee
(74) *Attorney, Agent, or Firm* — Sheridan Ross P.C.

(57) ABSTRACT

Provided is a battery which can reduce expansion caused by gas emission when stored at high temperature. A secondary battery (1) is constructed such that a flat wound electrode (20) as a power generating element is sandwiched between exterior members (30a, 30b), having adhesion layers (40a, 40b) interposed therebetween. The adhesion layers (40a, 40b) are, for example, two-sided adhesive tapes and have a structure such that adhesive layers are formed on both surfaces of a thin plate-shaped support layer. The support layer is preferably made of polypropylene or polyimide. The adhesion layers (40a, 40b) are composed of maleated polypropylene whose melting point is preferably in a range from 100° C. to 200° C., more preferably, in a range from 140° C. to 180° C.

12 Claims, 3 Drawing Sheets

FOREIGN PATENT DOCUMENTS

| | | | |
|---|---|---|---|
| EP | 0975031 A1 | | 1/2000 |
| EP | 0 997 954 A1 | | 5/2000 |
| EP | 1 102 336 | | 10/2000 |
| EP | 1102336 A1 | | 5/2001 |
| JP | 03-179666 | | 8/1991 |
| JP | 03179666 | | 8/1991 |
| JP | 09-106792 | | 4/1997 |
| JP | 11-086842 | | 3/1999 |
| JP | 11086842 | | 3/1999 |
| JP | 2000-215861 | * | 8/2000 |
| JP | 2001-126702 | | 5/2001 |
| JP | 2001-351692 | | 12/2001 |
| JP | 2002-157981 | | 5/2002 |

OTHER PUBLICATIONS

The definition of "Young's modulus" as retrieved from http://www.credoreference.com/entry/cre/young_s_modulus on Jan. 27, 2011.*

The definition of "modulus of elasticity" as retrieved from http://www.credoreference.com/entry/apdst/modulus_of_elasticity on Jan. 27, 2011.*

Machine translation of JP 2000-215861, retrieved from http://www.ipdl.inpit.go.jp/homepg_e.ipdl on Jan. 19, 2011.*

The polypropylene data sheet, retrieved from www.matweb.com on Nov. 21, 2011.*

The maleic acid data sheet retrieved from http://sis.nlm.nih.gov/chemical.html on Nov. 21, 2011.*

Supplementary European Search Report, dated May 27, 2009, 3 pages.

Communication Pursuant to Article 94(3) EPC dated Jun. 7, 2010.

European Patent Office, Communication Pursuant to Article 94(3) EPC for Application No. 02 780 053.1-2119, Registered Letter dated Sep. 23, 2011.

Communication Pursuant to Article 94(3) EPC dated Sep. 7, 2012.

* cited by examiner

ELECTRIC CELL

BACKGROUND OF THE INVENTION

The present invention relates to a battery constructed such that a power generating element is sealed in a film exterior member, such as a lithium ion polymer secondary battery.

Portable electronics devices such as notebook personal computers, integrated camera/VTRs (videotape recorders) or cellular phones have recently come into market one after another, and attempts at miniaturization and weight reduction of the devices are being made. In association with this trend, attention is being given to secondary batteries as a portable power supply, which can be carried around, and intensive studies to attain further higher energy density are being conducted. Amid such studies, a lithium ion secondary battery employing a non-aqueous electrolyte, which has higher energy density than that of a secondary battery with an aqueous electrolyte such as a lead secondary battery and a nickel cadmium secondary battery has been proposed and is being put into use.

Conventionally, with the lithium ion secondary battery, a liquid electrolyte (electrolytic solution) wherein lithium salt, which serves as a conducting ion, is dissolved in a non-aqueous solvent has been used. Therefore, to prevent leakage, hermeticity needs to be securely maintained inside a battery using a metallic case as an exterior member. Use of the metallic case as the exterior member, however, makes it very difficult to fabricate a sheet-type battery with a thin large area, a card-type battery with a small thin area, a flexible battery with an adjustable shape and the like.

To this end, a secondary battery using a gel electrolyte, instead of an electrolytic solution, has been proposed. With this gel electrolyte, a high molecular weight material retains an electrolytic solution containing lithium salt. Such a battery is free from leakage so that laminated film can be used as an exterior member, whereby much smaller, lighter and thinner batteries can be realized and batteries with flexible shapes also become feasible.

However, when laminated film is used as the exterior member, there is a problem such that expansion of the battery caused by gas emission inside the battery is significant when the battery is stored at a high temperature. The greatest cause of the expansion of the battery is vaporization of ingredients of electrolytic solutions. Further, gases emitted in dissolving electrolytic solutions such as hydrogen gas, carbonic acid gas and the like also produce expansion of the battery.

The present invention has been achieved in view of the aforementioned problems. The object of the present invention is to provide a battery which can reduce expansion of the battery due to gas emission occurring when storing at high temperature.

SUMMARY OF THE INVENTION

A battery of the present invention comprises a power generating element having an electromotive force, a film exterior member housing the power generating element therein, and insulative adhesion layers provided between the power generating element and the exterior member, wherein the adhesion layers include a thin plate-shaped support layer and adhesive layers formed on both surfaces of the support layer.

With the battery of the present invention, between the power generating element and the exterior member, insulative adhesion layers are provided and these adhesion layers adhere the power generating element to the exterior member, thereby reducing change in shape of the exterior member when gas emission occurs during high temperature storage. That is, thanks to the adhesion layers, the film exterior member is as uniform and stable in shape as a can. Accordingly, the expansion of the battery is reduced.

DETAILED DESCRIPTION OF THE PRESENTLY PREFERRED EMBODIMENTS

Embodiments of the present invention will be described in detail hereinbelow referring to the accompanying drawings.

First Embodiment

Figure 1:
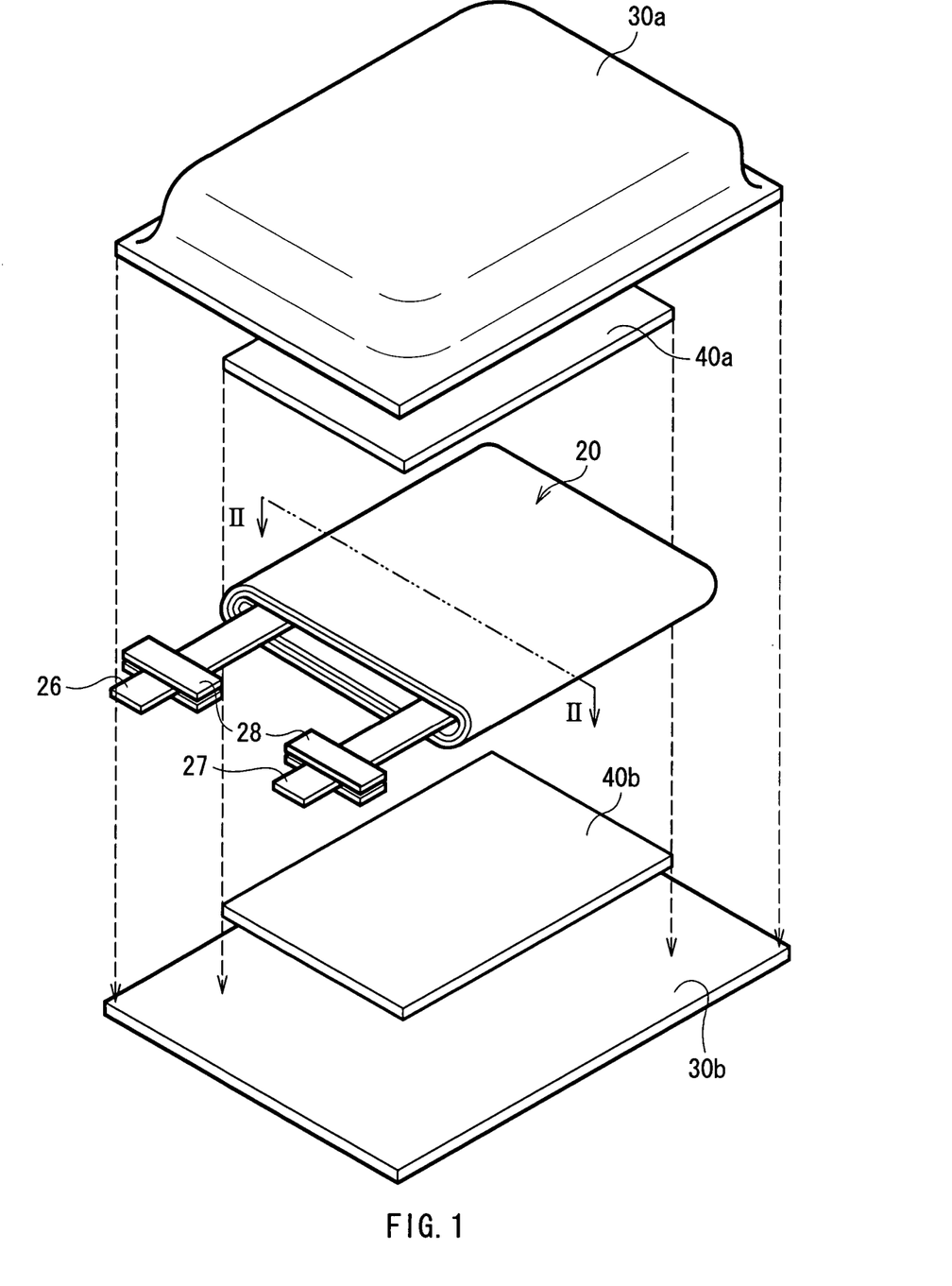
FIG. 1 is a perspective exploded view showing a disassembled secondary battery according to a first embodiment of the present invention.
Figure 2:
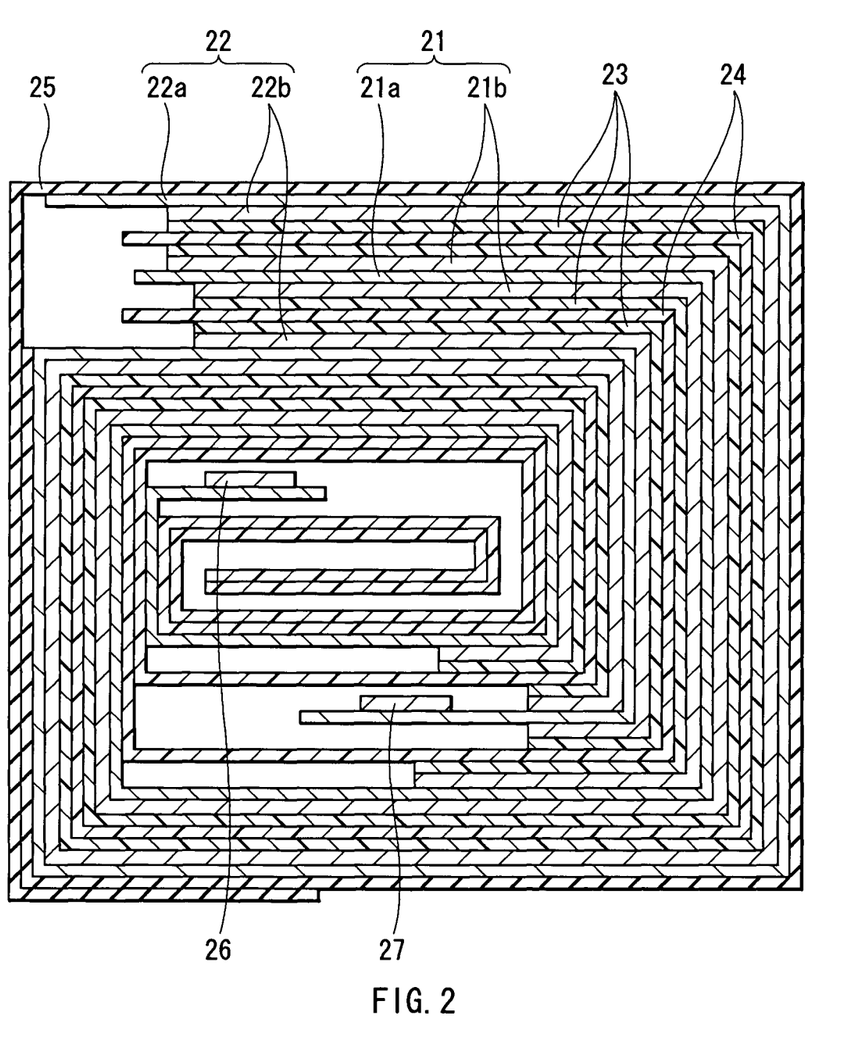
FIG. 2 is a cross sectional view of a wound electrode shown in FIG. 1 taken along the II-II line.

FIG. 1 is an exploded view showing a secondary battery 1 according to a first embodiment of the present invention. FIG. 2 illustrates a sectional structure of a wound electrode 20 shown in FIG. 1 taken along the II-II line. Described hereinbelow is a case where a secondary battery uses lithium (Li) as an electroactive species.

Figure 3:
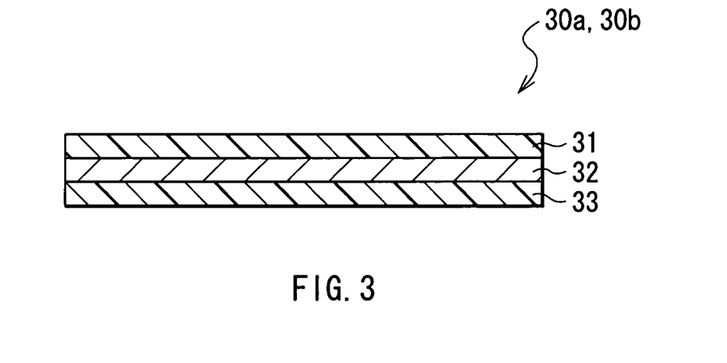
FIG. 3 is a cross sectional view showing a schematic structure of an exterior member shown in FIG. 1.

The secondary battery 1 is constructed such that the flat wound electrode 20, which serves as a power generating element, is sandwiched between exterior members 30a and 30b having adhesion layers 40a and 40b interposed therebetween. The exterior members 30a and 30b each constitute a laminated film where a insulating resin layer 31, a metallic foil 32 made of, e.g., aluminum and a thermally-fusible-resin layer 33 are laid and laminated in this order, namely, an aluminum laminated film as shown in FIG. 3. The insulating resin layer 31 is made of nylon, polyester, polyethylene terephthalate (PET) and so on, for example. The thermally-fusible-resin layer 33 is made of non-oriented polypropylene (CPP), polyethylene (PE) and the like, for example.

Figure 4:
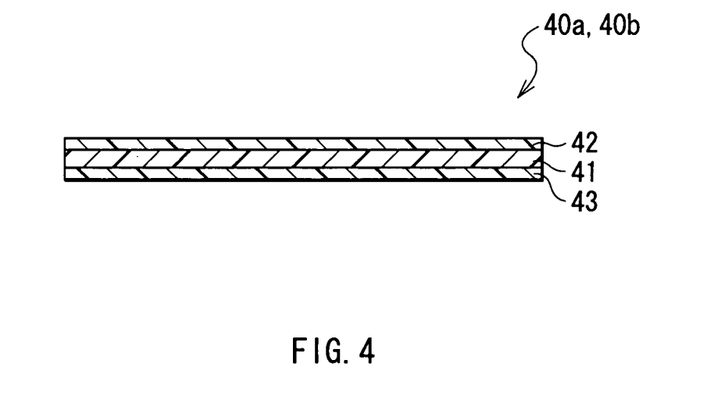
FIG. 4 is a cross sectional view showing a schematic structure of an adhesion layer shown in FIG. 1.

The insulative adhesion layers 40a and 40b adhere the wound electrode 20 to the exterior members 30a and 30b. The adhesion layers 40a and 40b are two-sided adhesive tapes and constructed such that adhesive layers 42 and 43 are formed on both surfaces of a thin plate-shaped support layer 41, for example, as shown in FIG. 4. The support layer 41 preferably includes at least one selected from the group consisting of polypropylene and polyimide, for example. However, it should be noted that high hygroscopic resins such as polyethylene or cellophane are not preferred for the support layer 41 because they might allow moisture to intrude inside the secondary battery 1.

The wound electrode 20 has a structure such that an anode 21 and a cathode 22 are sequentially laminated having separators 24, which are made of, e.g., microporous polyolefin film, therebetween and wound. An anode tab 26, made of aluminum or the like, is connected to the anode 21 and a cathode tab 27, made of nickel or the like, is connected to the cathode 22. Between the anode tab 26 and the cathode tab 27, and the exterior members 30a and 30b inserted are cohesive films 28, for example. The anode tab 26 and the cathode tab 27 are projected from the exterior members 30a and 30b. The cohesive films 28 secure insulation and improve adhesion of the anode tab 26 and the cathode tab 27 to the exterior members 30a and 30b.

The anode 21 is constructed such that an anode current collector layer 21a has a pair of opposing surfaces and anode mixture layers 21b are provided on both surfaces, for example. Incidentally, although not shown, the anode mixture layer 21b may be provided only on one surface of the anode current collector layer 21a. The anode current collector layer 21a is approximately from 5 μm to 50 μm in thickness and made of metallic foil such as aluminum foil, nickel foil and stainless steel foil, for example. The thickness of the anode mixture layer 21b is, e.g., from 80 μm to 250 μm. When the anode mixture layers 21b are provided on both surfaces of the anode current collector layer 21a, the sum of the thicknesses of the anode mixture layers 21b should be in this range.

The anode mixture layer 21b contains an anode active material and, if necessary, further contains a conductive agent such as carbon black or graphite and a binder such as polyvinylidene fluoride, for example. Examples of the anode active material are metal oxides such as $V_2O_5$ or lithium composite oxide, metal sulfides such as $TiS_2$ or $MoS_2$ or high molecular weight materials such as polyacetylene or polypyrrole. One of the above materials or a mixture of two or more thereof is used.

Among the above-mentioned materials, metal oxide is preferred because it rarely forms a lithium alloy due to its low reactivity with lithium. Especially, lithium composite oxide is desirable because it can increase voltage and energy density. Examples of the lithium composite oxide are ones expressed by a chemical formula of $Li_xMO_2$, for example. In the chemical formula, M denotes one or more kinds of transition metals and preferably at least one or more metals selected from the group consisting of cobalt (Co), nickel (Ni), and manganese (Mn). "x" varies according to the charge/discharge state of a battery and is usually a value in the range of $0.05 \leq x \leq 1.10$. Concrete examples of the lithium composite oxides are $LiCoO_2$, $LiNi_yCo_{1-y}O_2$ (0<y<1) and $LiMn_2O_4$.

The cathode 22 is constructed such that a cathode current collector layer 22a has a pair of opposing surfaces and cathode mixture layers 22b are provided on both surfaces, for example. Incidentally, although not shown, the cathode mixture layer 22b may be provided only on one surface of the cathode current collector layer 22a. The cathode current collector layer 22a is made of metallic foil, which exhibits good electrochemical stability, electrical conductivity and mechanical strength, such as copper (Cu) foil, nickel foil and stainless steel foil. Specifically, copper foil is most preferable for its high electrical conductivity. The cathode current collector layer 22a has preferably a thickness of about from 6 μm to 40 μm, for example. If it is smaller than 6 μm, its mechanical strength is reduced whereby the cathode current collector layer 22a tends to break in the manufacturing process, resulting in a lowering of manufacturing efficiency. If the thickness of the cathode current collector layer 22a is greater than 40 μm, the volume ratio of the cathode current collector layer 22a within the battery becomes greater than required, which makes it difficult to obtain high energy density. The thickness of the cathode mixture layer 22b is, e.g., about from 80 μm to 250 μm. When the cathode mixture layers 22b are provided on both surfaces of the cathode current collector layer 22a, the sum of the thicknesses of the cathode mixture layers 22b should be in this range.

The cathode mixture layer 22b contains a cathode active material and, if necessary, further contains a binder such as polyvinylidene fluoride, for example. The cathode active material preferably contains cathode materials allowing insertion and extraction of lithium. In the specification, "insertion and extraction of lithium" means that lithium ions are electrochemically inserted and extracted, retaining their ionicity, which includes not only a case where lithium exists in a fully-ionized state but also a case where lithium exists in a state which cannot be referred to as the fully-ionized state. Examples of the latter case include insertion through electrochemical intercalation of lithium ions into graphite, insertion of lithium into an alloy including an intermetallic compound, or insertion of lithium through alloying.

Examples of the cathode material allowing insertion and extraction of lithium include a carbonaceous material, a metal oxide or a high molecular weight material. Of these materials, the carbonaceous material is preferable since its crystal structure hardly changes during charge/discharge, and high charge/discharge capacity and preferable charge/discharge cycles are obtained. Examples of the carbonaceous material are pyrolytic carbons, cokes, graphites, glass carbons, organic high molecular weight compound sintered body, carbon fibers, spherical carbons and active carbons. The cokes include pitch coke, needle coke, and petroleum coke. The organic high molecular weight compound sintered body is obtained by sintering a high molecular weight material such as phenol resin or furan resin at a proper temperature and carbonizing the sintered resultant. Examples of the carbon fiber are mesophase carbon fiber and the like. Examples of the spherical onion are mesophase carbon microbead and the like. Examples of the metal oxide are iron oxide, ruthenium oxide and molybdenum oxide. Examples of the high molecular weight material are polyacetylene and polypyrrole.

Examples of the cathode material allowing insertion and extraction of lithium are metal elements and metalloid elements each of which can form an alloy with lithium, alloys of these elements, and compounds of these elements. The alloys include not only an alloy made of two or more metal elements but also an alloy made of one or more metal elements and one or more metalloid elements. Examples of the structures of the alloys include a solid solution, a eutectic (eutectic mixture), an intermetallic compound, or a mixture of two or more thereof.

Examples of such metal elements and metalloid elements are tin (Sn), lead (Pb), aluminum, indium (In), silicon (Si), zinc (Zn), antimony (Sb), bismuth (Bi), gallium (Ga), germanium (Ge), arsenic (As), silver (Ag), hafnium (Hf), zirconium (Zr) and yttrium (Y). An alloy or compound of any of these elements is expressed by, for example, a chemical formula of $Ma_sMb_tLi_u$ or $Ma_pMc_qMd_r$. In the chemical formulae, Ma indicates at least one of the metal elements and metalloid elements each capable of forming an alloy with lithium, Mb denotes at least one of the metal elements and metalloid elements other than lithium and Ma, Mc indicates at least one of the non-metallic elements, and Md indicates at least one of the metal elements and metalloid elements other than Ma. The values of s, t, u, p, q, and r satisfy $s>0$, $t \geq 0$, $u \geq 0$, $p>0$, $q>0$, and $r \geq 0$, respectively.

Particularly, 4B group metal elements and metalloid elements and alloys and compounds of these elements are preferable. More preferable elements are silicon and tin and their alloys and compounds. The most preferable are silicon and its alloys and compounds. The materials may be crystalline or amorphous ones. Specific examples of the alloys and compounds are LiAl, AlSb, CuMgSb, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v \leq 2$), $SnO_w$ ($0<w \leq 2$), $SnSiO_3$, LiSiO and LiSnO.

As the cathode material allowing insertion and extraction of lithium, one of the above materials or a mixture of two or more thereof is used.

On the anode mixture layer 21b and the cathode mixture layer 22b, electrolyte layers 23 made of a gel electrolyte are formed. The gel electrolyte is an electrolyte in which an electrolytic solution where lithium salt, which is electrolytic salt, is dissolved in a solvent is retained by a high molecular weight compound, for example. Examples of the high molecular weight compound are polyvinylidene fluoride, polyacrylonitrile, polyethylene oxide, polypropylene oxide and polymethacrylonitrile. One of the above materials or a mixture of two or more thereof is used depending on the application of the battery.

Examples of the lithium salt are $LiPF_6$, $LiBF_4$, $LiCF_3SO_3$, $LiN(CF_3SO_2)_2$ and $LiN(C_2F_5SO_2)_2$. One of these materials or a mixture of two or more thereof is used.

A solvent dissolves and dissociates electrolytic salt. As a solvent, various kinds of conventional non-aqueous solvents can be used, for example. Specific examples are ethylene carbonate, propylene carbonate, butylene carbonate, γ-butyrolactone, γ-valerolactone, diethoxyethane, tetrahydrofuran, 2-methyltetrahydrofuran, 1,3-dioxolane, methyl acetate, methyl propionate, dimethyl carbonate, diethyl carbonate, ethylmethyl carbonate, 2,4-difluoroanisole, 2,6-difluoroanisole and 4-bromoveratrole. One of the above materials or a mixture of two or more thereof is used.

The separator 24 is used to isolate the anode 21 and the cathode 22 from each other and pass lithium ions while preventing short-circuiting of current caused by contact of the electrodes. The separator 24 is made with, for example, an insulative thin film having high ion permeability and predetermined mechanical strength. Specific examples of the materials for the separator 24 are a porous film made of polyolefins such as polypropylene or polyethylene and a porous film made of inorganic materials such as nonwoven fabric made of ceramics, and two or more of these porous films may be laminated for use. The separator 24 preferably has a thickness of from 1 μm to 20 μm in light of mechanical strength and battery volume.

With the use of a liquid electrolyte for the electrolyte layer 23, the separator 24 may be impregnated with this liquid electrolyte. The liquid electrolyte includes a solvent and a lithium salt that is an electrolytic salt, for example.

Alternatively, the electrolyte layer 23 may be made of solid electrolytes. Examples of the solid electrolyte are organic solid electrolytes in which electrolytic salt is dispersed in a high molecular weight compound with ionic conductivity and inorganic solid electrolytes such as ion conductive ceramics, ion conductive glasses or ion crystals. Examples of the high molecular weight compound in the organic solid electrolyte are polyethylene oxides, ether high molecular weight compounds such as cross-linked polymers including polyethylene oxide or ester high molecular weight compounds such as polymethacrylate, and acrylate high molecular weight compounds. One of the aforementioned materials, a mixture thereof or a copolymer thereof is used. When the solid electrolyte is used, the separators 24 may be removed.

The secondary battery 1 is fabricated as follows, for example.

First, for instance, an anode mixture is prepared by mixing an anode active material, a conductive agent, and a binder and then dispersed in a solvent such as N-methyl-2-pyrrolidone to thereby obtain anode mixture slurry. After that, for example, the anode mixture slurry is applied to both surfaces or one surface of the anode current collector layer 21a made with metallic foil such as aluminum foil, nickel foil or stainless steel foil, and the resultant is dried and compression-molded, thereby obtaining the anode mixture layer 21b. Thus, the anode 21 is fabricated. At this time, one end of the anode current collector layer 21a is left uncoated with the anode mixture slurry so as to expose the end.

Subsequently, a cathode mixture is prepared by mixing a cathode active material and a binder and then dispersed in a solvent such as N-methyl-2-pyrrolidone to thereby obtain cathode mixture slurry, for example. After that, for example, the cathode mixture slurry is applied to both surfaces or one surface of the cathode current collector layer 22a made with metallic foil such as copper foil, nickel foil or stainless steel foil, and the resultant is dried and compression-molded, thereby obtaining the cathode mixture layer 22b. Thus, the cathode 22 is fabricated. At this time, one end of the cathode current collector layer 22a is left uncoated with the cathode mixture slurry so as to expose the end.

After forming the cathode 22, the anode tab 26 and the cathode tab 27 are attached respectively to the exposed portions of the anode current collector layer 21a and the cathode current collector layer 22a by means of resistance welding or ultrasonic welding, for example. The anode tab 26 and the cathode tab 27 are made respectively of a metal or an alloy with electrical conductivity. Preferably, the anode tab 26 is made of aluminum, and the cathode tab 27 is made of nickel, for example.

Next, for example, the electrolyte layers 23 made of a gel electrolyte are formed on the anode mixture layer 21b and the cathode mixture layer 22b. After formation of the electrolyte layers 23, for example, as shown in FIG. 2, the separator 24, the anode 21 on which the electrolyte layer 23 is formed, the separator 24 and the cathode 22 on which the electrolyte layer 23 is formed are sequentially laminated and wound, and then a protection tape 25 is affixed to the outermost periphery thereof, for example, thereby forming the wound electrode 20.

After forming the wound electrode 20, for example, the exterior members 30a and 30b made with aluminum laminated film as shown in FIG. 3 are prepared. The wound electrode 20 is sandwiched between the exterior members 30a and 30b having the adhesion layers 40a and 40b as in FIG. 4 interposed therebetween. The exterior members 30a and 30b are attached by pressure to the wound electrode 20 with the adhesion layers 40a and 40b in a reduced atmosphere, and peripheries of the exterior members 30a and 30b are sealed with a thermally-fusible-resin layer 33 by means of thermal fusion and the like. At this time, the cohesive films 28 are inserted between the anode tab 26 and the cathode tab 27, and the exterior members 30a and 30b, for example, and the anode tab 26 and the cathode tab 27 are protruded from the exterior members 30a and 30b. Thus, assembly of the secondary battery 1 is completed. The shape of the secondary battery 1 is not limited to the one shown in FIGS. 1 and 2 and other shapes are also applicable.

After being assembled, the secondary battery 1 is completed through, e.g., pressuring and ripening.

As has been described, according to the embodiment, between the exterior members 30a and 30b, and the wound electrode 20 provided are the adhesion layers 40a and 40b where the adhesive layers 42 and 43 such as two-sided adhesive tapes are formed on both surfaces of the support layer 41, and these adhesion layers 40a and 40b adhere the exterior members 30a and 30b to the wound electrode 20. Thus even when gas is emitted during storage at high temperature, deformation of the exterior members 30a and 30b is reduced. That is, thanks to the adhesion layers 40a and 40b, the exterior members 30a and 30b are as uniform and stable in shape as a can. Hence, expansion of the secondary battery 1 is reduced.

Second Embodiment

A secondary battery according to a second embodiment of the present invention has the same construction as that of the first embodiment except that the adhesion layers 40a and 40b are differently constituted, and is manufactured in the same manner as the first embodiment. Therefore, description is made referring to FIG. 1 and using the same reference numerals. Further, detailed description of the same elements is omitted.

The adhesion layers 40a and 40b are made of maleated polypropylene. The melting point of maleated polypropylene is preferably in a range from 100° C. to 200° C. and more preferably in a range from 140° C. to 180° C. If the melting point is lower than 100° C., maleated polypropylene might melt depending on the storage temperature of the secondary battery 1. If the melting point is higher than 200° C., a problem might occur during fusion process.

As has been described, according to the embodiment between the exterior members 30a and 30b, and the wound electrode 20, the adhesion layers 40a and 40b made of maleated polypropylene are interposed, and these adhesion layers 40a and 40b adhere the exterior members 30a and 30b to the wound electrode 20. Therefore, expansion of the secondary battery 1 due to gas emission during storage at high temperature is reduced as in the first embodiment.

Examples of the present invention will further be described in detail referring to FIGS. 1-4.

Examples 1 and 2

First, 95 wt % of lithium cobaltate ($LiCoO_2$) as an anode active material, 2 wt % of graphite as a conductive agent and 3 wt % of polyvinylidene fluoride as a binder were mixed to prepare an anode mixture. After adding N-methyl-2-pyrrolidone as a solvent, the anode mixture was mixed and stirred by a homogenizer to thereby produce anode mixture slurry. Next, the anode mixture slurry was applied uniformly to both surfaces of the anode current collector layer 21a which were made of aluminum foil and dried. The resultant was compression-molded by a roller press to form the anode mixture layer 21b, and the anode mixture layer 21b was cut to a predetermined size, thereby fabricating the sheet-shaped anode 21.

As a cathode active material, 87 wt % of mesophase carbon microbead with an average particle size of 25 μm, 3 wt % of graphite, and 10 wt % of polyvinylidene fluoride as a binder were mixed to prepare a cathode mixture. Next, N-methyl-2-pyrrolidone as a solvent was added to the cathode mixture and then mixed and stirred by a homogenizer to thereby produce cathode mixture slurry. Then, the cathode mixture slurry was applied uniformly to both surfaces of the cathode current collector layer 22a which were made of copper foil and dried. The resultant was compression-molded by a roller press to form the cathode mixture layer 22b and the cathode mixture layer 22b was cut to a predetermined size, thereby fabricating the sheet-shaped cathode 22.

Further, $LiPF_6$ was dissolved in a solvent where ethylene carbonate and polypropylene carbonate were mixed to thereby produce an electrolytic solution. After that, this electrolytic solution, polyvinylidene fluoride, which is a high molecular weight material, and dimethyl carbonate, which is a solvent made of a high molecular weight material, were mixed and stirred to produce an electrolyte.

After forming the anode 21, the cathode 22 and the electrolyte, the anode tab 26 was attached to the anode current collector layer 21a, the electrolyte was applied to the anode mixture layer 21b, and dimethyl carbonate was volatilized to thereby form the electrolyte layer 23. The cathode tab 27 was attached to the cathode current collector layer 22a, the electrolyte was applied to the cathode mixture layer 22b, and dimethyl carbonate was volatilized to thereby form the electrolyte layer 23. Subsequently, the separators 24 made with a microporous polyethylene film having a thickness of 9 μm were prepared and one of the separators 24, the anode 21, another one of the separators 24 and the cathode 22 were stacked in this order and wound, and then the protection tape 25 was affixed thereto, thereby obtaining the flat wound electrode 20.

After the formation of the wound electrode 20, the exterior members 30a and 30b made with aluminum laminated film were prepared, the cohesive films 28 were disposed between the anode tab 26 and the cathode tab 27, and the exterior members 30a and 30b, and the wound electrode 20 was vacuum-packed to thereby assemble the secondary battery 1. At this time, the adhesion layers 40a and 40b where the adhesive layers 42 and 43 were formed on both surfaces of the support layer 41 were interposed between the exterior members 30a and 30b, and the wound electrode 20. Table 1 shows the materials of the adhesion layers 40a and 40b and the support layer 41.

The thus obtained secondary batteries 1 were stored in an oven charged to 4.2 V at a temperature of 60° C. for one week and their expansion was examined. Table 1 shows the thicknesses of the secondary batteries 1 before and after storage.

Examples 3-8

The secondary batteries 1 were fabricated in the same manner as in Example 1 except that the adhesion layers 40a and 40b made with maleated polypropylene with the melting points shown in Table 2 were used. Similar to Example 1, with regard to Examples 3-8, the secondary batteries 1 were stored in an oven charged to 4.2 V at a temperature of 60° C. for one week and their expansion was examined. The results are shown in Table 2.

As a comparative example to the examples, a secondary battery was fabricated in the same manner as the examples except that the adhesion layers 40a and 40b were not provided. As for Comparison, similar to the examples, the secondary battery was stored in an oven charged to 4.2 V at a temperature of 60° C. for one week and its expansion was examined. The results are shown in Table 1.

As is shown in Tables 1 and 2, all Examples 1-8 exhibit expansion smaller than that of Comparison after being stored. That is, provision of the adhesion layers 40a and 40b reduces expansion when storing at high temperature.

While the present invention has been described with reference to the embodiments and examples, the present invention is not limited to those embodiments and examples, and various modifications are possible. For example, in the above embodiments and examples the wound electrode 20 is sealed in the exterior members 30a and 30b composed of aluminum laminated film, but the wound electrode 20 may be sealed in an exterior member composed of other types of laminated film.

Further, although in the above embodiments and examples, the electrolyte layer 23 made of a gel electrolyte is formed, the electrolyte layer may be composed of a solid organic electrolyte where electrolytic salt is dispersed in a high molecular weight compound with ionic conductivity or a solid inorganic electrolyte. Such a solid organic electrolyte layer is obtained by applying a fluid electrolyte layer to an electroactive layer and fully vaporizing a nonaqueous solvent.

Furthermore, although in the above embodiments and examples, the anode 21 and the cathode 22 are wound, the anode and the cathode may be folded or stacked.

Moreover, although in the above embodiments and examples, the two exterior members 30a and 30b are stuck together and the wound electrode 20 is sealed therein, other ways of sealing are also applicable. For example, one exterior member is folded and its peripheries are stuck together and the wound electrode 20 is sealed therein.

As has been described, according to the battery of the present invention, between the exterior member and the power generating element, the insulative adhesion layers are interposed and these adhesion layers adhere the exterior member to the power generating element, thereby reducing the expansion of the battery due to gas emission when storing at high temperature.

Obviously many modifications and variations of the present invention are possible in the light of the above teachings. It is therefore to be understood that within the scope of the appended claims the invention may be practiced otherwise than as specifically described.

TABLE 1

|  | Material of Support Layer | Thickness of Secondary Battery (mm) | |
|---|---|---|---|
|  |  | Pre-storage | Post-storage |
| Example 1 | Polypropylene | 3.65 | 3.72 |
| Example 2 | Polyimide | 3.62 | 3.71 |
| Comparison | — | 3.64 | 4.02 |

TABLE 2

|  | Melting Point of Maleated Polypropylene (° C.) | Thickness of Secondary Batter (mm) | |
|---|---|---|---|
|  |  | Pre-storage | Post-storage |
| Example 3 | 100 | 3.65 | 3.76 |
| Example 4 | 120 | 3.62 | 3.71 |
| Example 5 | 140 | 3.66 | 3.77 |
| Example 6 | 160 | 3.64 | 3.73 |
| Example 7 | 180 | 3.67 | 3.79 |
| Example 8 | 200 | 3.63 | 3.77 |

The invention claimed is:

1. A battery comprising:
   (a) a power generating element comprising oppositely facing first and second major surfaces;
   (b) electrodes associated with the power generating element;
   (c) first and second insulative adhesion layers, each of the first and second insulative adhesion layers including a support layer with a double-sided adhesive tape formed on oppositely facing sides of the support layer; and
   (d) a film exterior member made of a laminated film and formed by upper and lower members,
   wherein,
      (i) the electrodes, the first insulative adhesion layer and the second insulative adhesion layer are entirely enclosed within the film exterior member, with tab portions extending from the electrodes exposed outside of said film exterior member,
      (ii) the insulative adhesion layers are interposed between the power generating element and the film exterior member,
      (iii) the first insulative adhesion layer is between the first major surface and the film exterior member,
      (iv) the second insulative adhesion layer is between the second major surface and the film exterior member,
      (v) the first and second insulative adhesion layers are adhered to the exterior member and the first and second major surface, respectively, by their respective double-sided adhesive tape so that the upper and lower members of the film exterior member directly abut each other about a perimeter of the film exterior member,
      (vi) the support layers do not include polyethylene or cellophane,
      (vii) the support layers comprise a polypropylene or a polyimide film, and
      (viii) the adhesion layers comprise a pressure-attach adhesive.

2. A battery according to claim 1, wherein the exterior member comprises a laminated film, the laminated film comprising a first resin layer, a metallic foil and a second resin layer.

3. A battery according to claim 1, wherein the power generating element is a wound electrode comprising:
   (a) an anode comprising an anode mixture layer formed on an anode current collector layer;
   (b) a cathode comprising a cathode mixture layer formed on a cathode current collector layer; and
   (c) electrolytes interposed between the anode and the cathode;
wherein,
   the anode and cathode are laminated and wound.

4. A battery according to claim 3, wherein the electrolyte comprises a high molecular weight material.

5. A battery according to claim 3, wherein:
   (a) the anode mixture layer comprises a lithium composite oxide comprises lithium (Li) and a transition element, and
   (b) the cathode mixture layer comprises a cathode material allowing insertion and extraction of lithium.

6. A battery according to claim 5, wherein:
   (a) the anode mixture layer comprises a lithium composite oxide of chemical formula $LiMO_2$ where M denotes at least one transition metal selected from the group consisting of cobalt (Co), nickel (Ni) and manganese (Mn), and
   (b) the cathode mixture layer comprises a carbonaceous material.

7. A battery according to claim 3, wherein the anode mixture layer is formed on both surfaces of the anode current collector layer and the cathode mixture layer is formed on both surfaces of the cathode current collector layer.

8. The battery of claim 1, wherein the first and second insulative adhesion layers are maleated polypropelene with a melting in from 100 degrees Centigrade to 200 degrees Centigrade.

9. The battery of claim 1, wherein the first and second insulative adhesion layers are maleated polypropelene with a melting in from 140 degrees Centigrade to 180 degrees Centigrade.

10. The battery of claim 1, wherein each of the support layers is a plate-shaped parallelogram.

11. The battery of claim 1, wherein the adhesion layers are spaced from the tab portions of the electrodes.

12. The battery of claim 1, wherein the upper and lower members of the film exterior member directly abut each other about an entirety of the perimeter except where the tab portions extend from the electrodes.

* * * * *